United States Patent
Shin

(10) Patent No.: US 7,620,434 B2
(45) Date of Patent: Nov. 17, 2009

(54) APPARATUS AND METHOD FOR DETECTING HOOK SWITCH OF A MOBILE COMMUNICATION TERMINAL

(75) Inventor: Dong-Wook Shin, Seoul (KR)

(73) Assignee: LG Electronics Inc., Seoul (KR)

(*) Notice: Subject to any disclaimer, the term of this patent is extended or adjusted under 35 U.S.C. 154(b) by 290 days.

(21) Appl. No.: 11/556,139

(22) Filed: Nov. 2, 2006

(65) Prior Publication Data
US 2007/0099607 A1 May 3, 2007

(30) Foreign Application Priority Data
Nov. 2, 2005 (KR) .................. 10-2005-0104603

(51) Int. Cl.
*H04M 1/00* (2006.01)
(52) U.S. Cl. .................. 455/575.2; 455/569.1
(58) Field of Classification Search .............. 455/575.2
See application file for complete search history.

(56) References Cited

U.S. PATENT DOCUMENTS

| | | | |
|---|---|---|---|
| 5,794,163 A * | 8/1998 | Paterson et al. .......... | 455/575.2 |
| 6,922,572 B2 * | 7/2005 | Lim .......................... | 455/570 |
| 6,988,905 B2 * | 1/2006 | Corey et al. ............... | 439/222 |
| 7,110,799 B1 * | 9/2006 | Willins et al. ............. | 455/575.2 |
| 2006/0253237 A1 * | 11/2006 | Dannenberg et al. ......... | 701/36 |

OTHER PUBLICATIONS

"Professional headsets from GN Netcom", Dec. 2001, pp. 1-3 http://findarticles.com/p/articles/mi_qa5359/is_200112/ai_n21466231.*

* cited by examiner

*Primary Examiner*—Nick Corsaro
*Assistant Examiner*—Munsoon Choo
(74) *Attorney, Agent, or Firm*—Lee, Hong, Degerman, Kang & Waimey

(57) ABSTRACT

A method for preventing malfunction of a mobile communication terminal when a headset is used is provided. The method includes detecting an ON state of a hook switch according to pre-set options and outputting a first detect signal. The method further includes determining that a headset has been inserted into the mobile communication terminal and outputting a second detect signal.

11 Claims, 3 Drawing Sheets

FIG.4

```
if(|al|GpioChangeInd -> gpioReference = = GPIOREF_HOOK_DETECT) {
if(!DLGpioReadInputLine(GPIO_FOR_EARJACK_DETECT)) {
    if(HookKeyPressed = = TRUE) {
      HookKeyPressed = FALSE;
      if(WhichKeySent = = KEY_HOOK_ON) {
      PadSendMmiKeypressInd(KEY_HOOK_ON, FALSE); }
    else{
      PadSendMmiKeypressInd(KEY_HOOK_VOICE, FALSE); }
    }
}
else if(DLGpioReadInputLine(GPIO_FOR_EARJACK_DETECT)) {
    if(HookKeyPressed != |al|GpioChangeInd -> gpioState) {
      HookKeyPressed = |al|GpioChangeInd -> gpioState;
      if(HookKeyPressed = = TRUE) {
        if(afshGetInCallFlag( ) = = TRUE) {
          PadSendMmiKeypressInd(KEY_HOOK_ON, TRUE);
          WhichKeySent = KEY_HOOK_ON; }
        else{
          PadSendMmiKeypressInd(KEY_HOOK_VOICE, TRUE);
          WhichKeySent = KEY_HOOK_VOICE; }
      }
      else{
        if(WhichKeySent = = KEY_HOOK_ON) {
PadSendMmiKeypressInd(KEY_HOOK_ON, FALSE); }
        else{
          PadSendMmiKeypressInd(KEY_HOOK_VOICE, FALSE); }
      }
    }
  }
}
```

APPARATUS AND METHOD FOR DETECTING HOOK SWITCH OF A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2005-0104603, filed Nov. 2, 2005, the contents of which is hereby incorporated by reference herein in its entirety.

FIELD OF THE INVENTION

The present invention relates to a mobile communication terminal and, more particularly, to an apparatus and method for detecting a hook switch of a mobile communication terminal in order to prevent malfunction when a general headset is used.

DESCRIPTION OF THE RELATED ART

In general, a mobile communication terminal is a device with which a user can wirelessly page another party and be wirelessly connected for communication any time and anywhere. This can be achieved by switching under control of a mobile switching center (MSC) while traveling in a service area managed by a base station (BS) and allows data communication of symbols, numbers or characters and multimedia communication including an image signal, as well as voice communication.

When selecting a headset that is connected to a mobile communication terminal to support a hands-free function, design, handiness, stability, performance and firmness are among the most important characteristics considered by consumers. Headset manufacturers are focusing on development of new techniques to address these selection characteristics.

Headsets include a transmitter (microphone) and a receiver. They are used to improve bi-directional communications in various fields such as a phone set, a mobile phone and a computer.

A headset can be inserted into a connection port of a mobile communication terminal and a hook switch mounted on the headset can be turned on and off, thereby allowing a user to work, for example, on a computer or something else during call communication by using the hands-free function of the headset. A headset can also be useful when the user uses a mobile phone in a vehicle.

Diverse headsets are currently being marketed and used, with each headset having various electrical characteristics according to manufacturers and model. The most important electrical characteristic is an impedance value of the headset.

If a headset having a different impedance value is inserted into a mobile communication terminal, the mobile communication terminal may malfunction. Specifically, call disconnection and key lockup are considered critical problems, which can occur frequently.

For example, when a headset with a low resistance value is connected to or released from a mobile communication terminal, a value different from a value previously set in hardware may be detected such that the mobile communication terminal detects that the hook switch has been pressed, thereby causing a call disconnection and the key lockup phenomenon. Additionally, when a three-pole headset is released from a terminal, a headset_micp terminal may instantly contact a headset_right terminal, thereby generating a continuous glitch of the signal for detecting an ON/OFF state of the hook switch. As a result, the ON state of the hook switch may be only intermittently recognized while the OFF state of the hook switch may not be recognized, thereby causing call disconnection and the key lockup phenomenon.

Although there have been many efforts to solve these problems, it is not yet possible to process impedance values which are different for each headset through hardware tuning. In order to avoid these problems, manufactures of mobile communication terminals provide a bundle headset suitable for each terminal purchased or, in other words, a dedicated headset. However, a user that loses the bundle headset may use a general headset, thereby still encountering the problem of call disconnection and key lockup.

Since a related art mobile communication terminal only detects the ON/OFF state of the hook switch and is operated according to this detection, malfunction of the mobile communication terminal may occur if different headsets, such as general headsets each having a different impedance, are inserted or released from the mobile communication terminal. These problems have not been solved by hardware or software.

SUMMARY OF THE INVENTION

One object of the present invention is to provide an apparatus and method for detecting a hook switch of a mobile communication terminal capable of preventing malfunction of the mobile communication terminal that can be generated when a general headset is used instead of a dedicated headset.

In one aspect of the present invention, a method for preventing malfunction of a mobile communication terminal when a headset is used is provided. The method includes detecting an ON state of a hook switch according to pre-set options and outputting a first detect signal and determining that a headset has been inserted into the mobile communication terminal and outputting a second detect signal.

It is contemplated that determining that a headset has been inserted includes determining whether the headset is a dedicated headset or a general headset according to the first and second detect signals and generating a control signal for controlling operation of the mobile communication terminal. It is further contemplated that the control signal indicates a hook release signal when it is determined that the headset is a general headset.

It is contemplated that the hook release signal indicates an OFF state of the hook switch for a short period of time. It is further contemplated that the pre-set options comprise at least one of a debouncing period and a polling detection period. Preferably, the debouncing period is 20 seconds.

In another aspect of the present invention, an apparatus for preventing malfunction of a mobile communication terminal when a headset is used is provided. The apparatus includes a first detecting unit adapted to detect an ON/OFF state of a hook switch according to pre-set options and output a first detect signal when the ON state is detected and a second detecting unit adapted to determine whether a headset is inserted into the mobile communication terminal and output a second detect signal when insertion of a headset is detected and the ON state of the hook switch is detected.

It is contemplated that the apparatus further includes a controller adapted to determine whether a detected headset is a general headset or a dedicated headset according to the first and second detect signals and generate a control signal for controlling operation of the mobile communication terminal. It is further contemplated that the controller is further adapted to generate the control signal indicating a hook release signal when the detected headset is a general headset.

It is contemplated that the hook release signal indicates an OFF state of the hook switch for a short period of time. It is further contemplated that the pre-set options comprise at least one of a debouncing period and a polling detection period. Preferably, the debouncing period is 20 seconds.

In another aspect of the present invention, a method for preventing malfunction of mobile communication terminal that performs a hands-free function by using a headset with a hook switch, the method including detecting an ON/OFF a state of the hook switch according to pre-set options, determining whether a dedicated headset or a general headset has been inserted in the mobile terminal if an ON state of the hook switch is detected and generating a control signal for controlling operation of the mobile communication terminal according to the detected ON/OFF state of the hook switch and whether a dedicated headset or a general headset is inserted.

It is contemplated that the control signal indicates a hook release signal when a general headset is inserted. It is further contemplated that the hook release signal indicates an OFF state of the hook switch for a short period of time.

It is contemplated that the control signal is a signal for allowing normal operation of the mobile communication terminal when a dedicated headset is inserted. It is further contemplated that the pre-set options comprise at least one of a debouncing period and polling detection period. Preferably, the debouncing period is 20 seconds.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 4 illustrates a portion of an algorithm according to the present invention for determining if a headset has been inserted into a mobile communication terminal.

DETAILED DESCRIPTION OF THE PREFERRED EMBODIMENTS

The present invention prevents malfunction of a mobile communication terminal when a headset of a different manufacturer, such as a general headset, is used. By detecting an ON/OFF state of a hook switch according to pre-set options, a determination is made whether a headset has been inserted is made when the hook switch is turned on and a hook release signal is generated.

Figure 1:
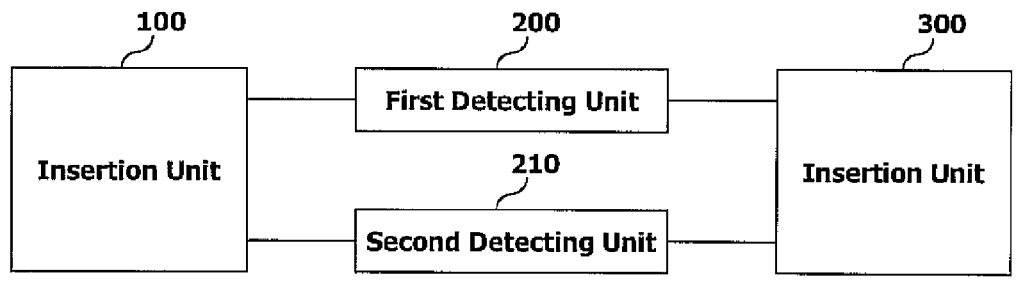
FIG. 1 illustrates the construction of an apparatus for detecting a hook switch of a mobile communication terminal according to the present invention.

FIG. 1 illustrates the construction of an apparatus for detecting a hook switch of a mobile communication terminal according to the present invention. As illustrated in FIG. 1, the apparatus includes an insertion unit 100 adapted to allow a headset with a hook switch to be inserted or withdrawn, a first detecting unit 200 adapted to detect an ON/OFF state of the hook switch according to pre-set options and output a first detect signal, a second detecting unit 210 adapted to determine whether a headset is inserted or withdrawn and output a second detect signal and a controller 300 for controlling operation of the mobile communication terminal according to the first and second detect signals output from the first 200 and second 210 detecting units, respectively.

Figure 2:
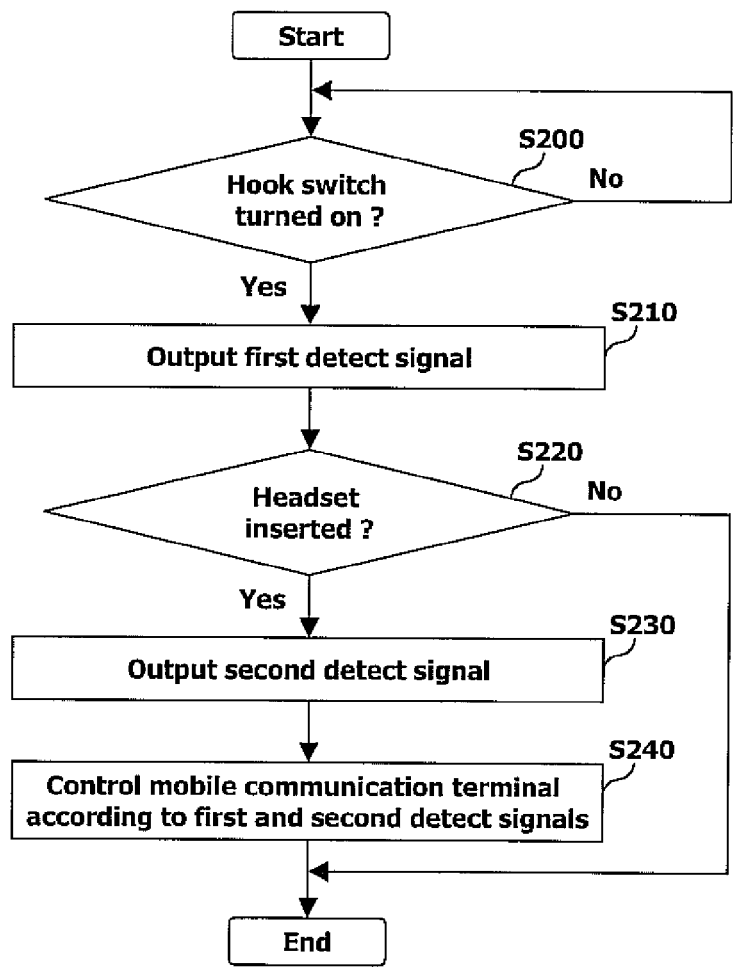
FIG. 2 illustrates a method for detecting a hook switch of a mobile communication terminal according to the present invention.

FIG. 2 illustrates a method for detecting a hook switch of a mobile communication terminal according to the present invention. As illustrated in FIG. 2, the method includes detecting an ON/OFF state of the hook switch according to the pre-set options (step S200), outputting a first detect signal when the hook switch is turned on (step S210), determining whether a headset has been inserted (step S220), outputting a second detect signal if a headset is inserted (step S230) and controlling operation of the mobile communication terminal according to the first and second detect signals.

When the hook switch is turned on and a headset has not been inserted, malfunction of the mobile communication terminal due to insertion or removal of a headset with different impedance can be prevented by the method illustrated in FIG. 2. The method for detecting the hook switch of the mobile communication terminal according to the present invention will be described in detail as follows.

First, the first detecting unit 200 detects the ON/OFF state of the hook switch based according to the pre-set options (step S200) and outputs a first detect signal when the hook switch is turned on (step S210). Specifically, the first detecting unit 200 receives a hook detect signal from the hook switch and detects an ON/OFF state of the hook switch according to the pre-set options, such as a debouncing period or a polling detection period.

The debouncing period can be set, for example, as 20 seconds, rather than the 5 seconds in the related art. The debouncing period is set as 20 seconds because, although a glitch initially occurs in a hook detect signal output from the first detecting unit 200 when a headset of a different manufacturer is inserted into or withdrawn from the mobile communication terminal, the ON/OFF state of the hook switch can be stably detected after a certain time lapses (e.g., in about 20 seconds). However, as the debouncing period is increased, detection of the ON/OFF state of the hook switch may be delayed.

The mobile communication terminal detects the ON/OFF state of the hook switch during a detection period by the polling, for example, at a certain frequency, in order to prevent delayed detection of the ON/OFF state of the hook switch as the debouncing period is increased. Specifically, by utilizing a polling detection method, the phenomenon that detecting the ON/OFF state of the hook switch is delayed as a debouncing period is increased can be prevented and the ON/OFF state of the hook switch can be more accurately detected.

Figure 3:
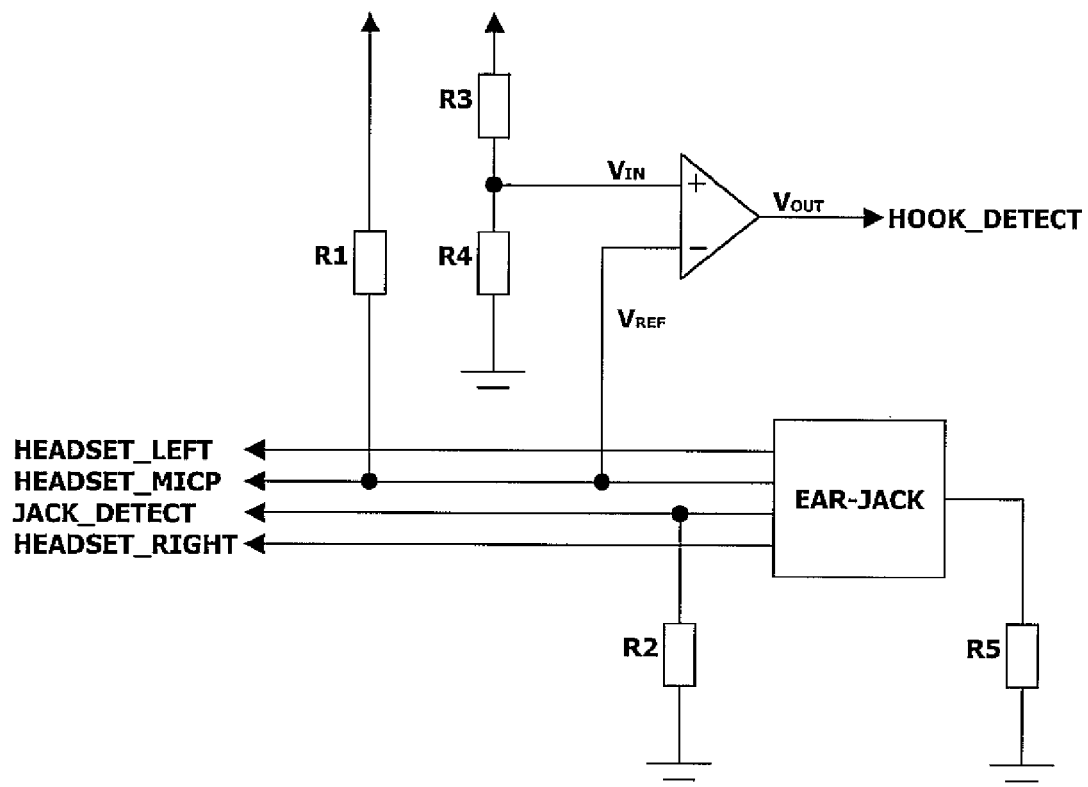
FIG. 3 is a schematic view for explaining a principle of detecting an ON/OFF state of the hook switch of a mobile communication terminal according to the present invention.

The principle of detecting the ON/OFF state of the hook switch will now be described with reference to FIG. 3. FIG. 3 is a schematic view for explaining a principle of detecting the ON/OFF state of the hook switch according to the present invention. As illustrated in FIG. 3, when the hook switch of a mobile communication terminal is in the ON state, a voltage Vref, applied to an inversion terminal of an amplifier is decreased below a voltage Vin (e.g., 690 mV) applied to a non-inversion terminal of the amplifier and an output voltage Vout increased such that the first detecting unit 200 can detect the ON state of the hook switch.

Thereafter, while the hook switch is turned on, the second detecting unit 210 determines whether a headset has been inserted (step S220) and, if a headset has been inserted, the second detecting unit outputs the second control signal (step S230). Specifically, malfunction of the mobile communication terminal when a headset with different impedance is inserted can be prevented.

For example, a portion of a software algorithm for determining whether a headset has been inserted is illustrated in FIG. 4. Referring to FIG. 4, the parameter 'GPIOREF_HOOK_DETECT' refers to a GPIO (General Purpose Input Output) indicating the ON/OFF state of the hook switch and the parameter 'GPIO_FOR_EARJACK_DETECT" refers to a GPIO indicating whether a headset has been inserted.

The determination of whether a headset has been inserted while the hook switch is turned on according to the portion "if(|a||GpioChangeInd-> . . . ' will be explained as follows.

First, the 'if(IDLGpioReadInputLine . . . ' portion of the code detects that the hook switch has been turned on but a dedicated headset has not been inserted, so malfunction of the mobile communication terminal while a general headset with different impedance is inserted can be prevented. Specifically, when the hook switch has been turned on but a dedicated headset has not been inserted, such as when a headset having different impedance of a different manufacturer is inserted, the mobile communication terminal can generate a signal indicating the OFF state of the hook switch to thereby prevent call disconnection and the key lockup phenomenon.

Generally, the hook switch must be pressed for a long time in order to connect or disconnect a call in most mobile communication terminals. Accordingly, if a headset with different impedance is inserted, the system detects the headset and generates the signal indicating the OFF state of the hook switch to obtain the effect of pressing the hook switch for a short time rather for a long time. In this way, call disconnection and key lockup phenomenon does not occur because pressing the hook switch for a short time causes only a backlight of the LCD (Liquid Crystal Display) to turn on, but does not cause malfunction of the mobile communication terminal.

Second, the 'else if(DLGpioReadInputLine . . . ' portion detects that the hook switch has been turned on and a dedicated headset has been inserted, so the mobile communication terminal can perform a normal operation. Because the controller determines whether a dedicated or general headset has been inserted according to the first and second detect signals and generates a control signal for controlling operation of the mobile terminal, such as the control signal for controlling call disconnection or key lockup (step S240), malfunction of the mobile communication terminal when a headset with different impedance is inserted can be prevented.

The procedure for changing the debouncing period and detecting the ON/OFF state of the hook switch may be complemented and malfunction of the mobile communication terminal can be prevented through three combinations of the methods for detecting the ON/OFF state of the hook switch by polling.

The apparatus and method for detecting the hook switch of the mobile communication terminal according to the present invention has the advantage that malfunction of the mobile communication terminal can be prevented by detecting the ON/OFF state of the hook switch according to pre-set options and determining whether a headset has been inserted while the hook switch is turned on.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for preventing malfunction of a mobile communication terminal when a headset is used, the method comprising:
    detecting an ON state of a hook switch according to pre-set options and outputting a first detect signal;
    determining that a headset has been inserted into the mobile communication terminal and outputting a second detect signal;
    determining a type of the headset according to the first and second detect signals, wherein the type of the headset is a dedicated headset or a general headset; and
    generating a hook release signal in response to a determination that the type of the headset is the general headset, wherein the hook release signal momentarily indicates an OFF state of the hook switch to prevent a disconnection of a call.

2. The method of claim 1, wherein the pre-set options comprise at least one of a debouncing period and a polling detection period.

3. The method of claim 2, wherein the debouncing period is 20 seconds.

4. An apparatus for preventing malfunction of a mobile communication terminal when a headset is used, the apparatus comprising:
    a first detecting unit adapted to detect an ON or OFF state of a hook switch according to pre-set options and output a first detect signal when the ON state is detected;
    a second detecting unit adapted to determine whether a headset is inserted into the mobile communication terminal and output a second detect signal when insertion of the headset is detected and the ON state of the hook switch is detected; and a controller adapted to determine a type of the headset according to the first and second detect signals and to generate a hook release signal in response to a determination that the type of the headset is a general headset, wherein the hook release signal momentarily indicates the OFF state of the hook switch to prevent a disconnection of a call.

5. The apparatus of claim 4, wherein the type of the headset is the general headset or a dedicated headset.

6. The apparatus of claim 4, wherein the pre-set options comprise at least one of a debouncing period and a polling detection period.

7. The apparatus of claim 6, wherein the debouncing period is 20 seconds.

8. A method for preventing malfunction of mobile communication terminal that performs a hands-free function by using a headset with a hook switch, the method comprising:
   detecting an ON or OFF state of the hook switch according to pre-set options and providing a first detect signal according to the detection;
   determining whether a headset has been inserted in the mobile communication terminal and providing a second detect signal according to the determination;
   identifying a type of the headset according to the first and second detect signals if the ON state of the hook switch is detected, wherein the type of the headset is a dedicated headset or a general headset; and
   generating a control signal depending on the detected ON or OFF state of the hook switch, wherein the control signal indicates a hook release signal in response to a determination that the type of the headset is the general headset, wherein the hook release signal momentarily indicates the OFF state of the hook switch to prevent a disconnection of a call.

9. The method of claim 8, wherein the control signal is a signal for allowing normal operation of the mobile communication terminal if the type of the headset is the dedicated headset.

10. The method of claim 8, wherein the pre-set options comprise at least one of a debouncing period and polling detection period.

11. The method of claim 10, wherein the debouncing period is 20 seconds.

* * * * *